Patented Sept. 3, 1946

2,407,149

UNITED STATES PATENT OFFICE 2,407,149

STABILIZED 2-CHLOR-BUTENE-2

Clyde B. Gardenier, Belleville, N. J., assignor to Thomas A. Edison, Incorporated, West Orange, N. J., a corporation of New Jersey No Drawing. Application September 8, 1944, Serial No. 553,280

6 Claims. (Cl. 252—364)

This invention relates to novel compositions of matter and to methods for preparing the same. More particularly this invention is directed to stabilized 2 chlor butene 2 and to methods for preparing the same.

In the production of butadiene, one of the by-product fractions contains 2 chlor butene 2 in both the cis and trans forms, 3 chlor butene 1, and 1 chlor butene 2 having the following accepted formulas respectively, $CH_3CCl:CHCH_3$, $CH_2:CHCHClCH_3$, and $CH_3CH:CHCH_2Cl$. This fraction containing said compounds, is a black liquid when it is about two weeks old and to the best of my knowledge has found no application and consequently practically all of it is dumped as a waste product. In the course of my experimentation with said fraction, I have found that said fraction containing said metameric compounds may be treated to provide products which either alone or combined with other products are useful.

According to this invention, said fraction containing said metameric compounds is treated to selectively separate the primary and secondary halides, namely, the 1 chlor butene 2 and the 3 chlor butene 1 from the 2 chlor butene 2. This separation may be accomplished by selective reaction and precipitation and the resultant or residual 2 chlor butene 2, which is substantially free from said primary and secondary compounds, I have found may be used in some fields. This resultant 2 chlor butene 2 has a specific gravity below 1 at 25° C. and a boiling range of between about 60° C. to 75° C. This resultant 2 chlor butene 2 is a mixture of 2 chlor butene 2 trans and 2 chlor butene 2 cis. While I have found that this resultant 2 chlor butene 2, separated from said primary and secondary halides, has certain properties, I have also found that it is not stable and after left standing under normal conditions of temperature and pressure for about 24 hours, the pH thereof has decreased and it has become darker in color. The 2 chlor butene 2 exists only momentarily in the pure state due to the fact that it undergoes degradation due to hydrolysis thereof with the consequent production of HCl and other degradation products.

In the course of my experimentations with 2 chlor butene 2, I have discovered that the stability of 2 chlor butene 2 either in the trans or cis form or a mixture thereof in said different forms may be considerably improved. I have found that 2 chlor butene 2 may be maintained substantially free from degradation products thereof for considerable periods of time. Among the many compounds that may be added thereto for this purpose are alcohols, amines, chloroform and the like. The compounds which are added either alone or in combination to the 2 chlor butene 2 must be capable of forming a solution therewith and may be in the liquid, solid or gaseous state. These alcohols may be primary, secondary or tertiary alcohols and they may be saturated or unsaturated by having one or more acetylenic or ethylenic linkage. These alcohols may be monohydric or polyhydric. The amines may be primary, secondary, or tertiary amines. Among some of the specific compounds that are particularly suitable for this purpose and may be used either alone or in combination are methyl alcohol, ethyl alcohol, propyl alcohol, isopropyl alcohol, chloroform, triethanolamine, phenyl alpha naphthylamine, amino methyl propanol, diphenyl guanidine, triisopropanol amine, hexamethylene amine and 2 amino 2 methyl propane diol. The ratio by weight of the stabilizer to the 2 chlor butene 2 is dependent on the stabilizer employed. When the amines are so employed the ratio of stabilizer to 2 chlor butene 2 may be as low as 1 part amine to 10,000 parts 2 chlor butene 2 by weight. When the alcohol or chloroform is employed, the volume ratio of the alcohol or chloroform to the 2 chlor butene 2 should be at least 5 to 100. I have discovered that 2 chlor butene 2 may be stabilized for varying lengths of time depending on the stabilizer or combination of stabilizers employed.

While one or a combination of two or more of said stabilizers may be added to 2 chlor butene 2 to stabilize the same, I prefer in certain instances, to first separate the 2 chlor butene 2 trans from the cis form and to maintain the 2 chlor butene 2 trans in the presence of the stabilizer in the course of and after this separation step thus to eliminate substantially entirely any liability of degradation of 2 chlor butene 2 trans during separation and for a substantial period thereafter. This I accomplish by adding to 2 chlor butene 2 cis and trans one or more of said alcohols and/or chloroform and this liquid mass is then subjected to distillation and the fraction of the distillate boiling within about 59° C. and 64° C. and preferably within about 61° C. and 62° C. is separated and collected. These distillates I have found to be stable for at least 72 hours and the 2 chlor butene 2 therein is substantially completely in the trans form and will remain for at least 72 hours in that form free from degradation products as evidenced by lack of any change of color or pH in that period. While the quantity by volume of said alcohols or chloroform in said mass being distilled may vary, it should be at least 5% by volume of the mass and its maximum limit may be of any desired value depending upon the end product desired. When one of said alcohols or chloroform is used alone with said 2 chlor butene 2 to separate the trans from the cis as above set forth, I have found that the stability of the 2 chlor butene 2 in the distillate is limited in time and that the time of stability may be greatly increased by adding thereto a quantity of an amine which is soluble therein and examples of which have been heretofore set forth. The quantity of said amine added to said distillate may be as low as 1 part by weight of the amine to 10,000 parts by weight of the distillate, and of course it may be much higher if desired. By adding such small amounts of one or more said amines to said distillates, the time of stability of the 2 chlor butene 2 trans therein may be considerably increased. When one or more of the alcohols and chloroform are employed together with the 2 chlor butene 2, I have found that the resulting distillate is stable for a longer period of time than the distillate containing no chloroform.

In the practice of this invention; I prefer that the ratio of the 2 chlor butene 2, whether in the trans or cis form or as a mixture of the trans and cis forms, to the chloroform whether used alone or in combination with one or more of the alcohols and preferably methyl, ethyl, propyl and isopropyl alcohol, be between about 10 to 1 and 1 to 10 parts by volume and to the alcohol whether used alone or in combination with the chloroform be no greater than about 20 to 1, with the lower limit being any desirable amount depending upon the dilution required with the alcohol.

This invention accordingly comprises the several steps and relation of one or more of such steps with respect to each of the others, and compositions of matter possessing the characteristics, properties and relation of components, all of which will be exemplified in the following detailed disclosure, and the scope of the invention will be indicated in the claims.

The following are specific examples which are set forth merely to illustrate the invention and are not to be construed by way of limitatiton.

In the practice of this invention, I prefer that the ratio of the 2 chlor butene 2, whether in trans or cis form or as a mixture of the trans and cis forms, to the chloroform whether used alone or in combination with isopropyl alcohol be between about 10 to 1 and 1 to 10 parts by volume and to the isopropyl alcohol whether used alone or in combination with the chloroform be no greater than about 20 to 1, with the lower limit being any desirable amount depending on the dilution with isopropyl alcohol that may be required.

The following tables, for the purposes of illustration, show the preferable ranges when 2 chlor butene 2 is employed with isopropyl alcohol and/or chloroform. The term 2 chlor butene 2 as employed herein and in the claims and when not qualified as to being in the trans or cis form is meant to include said compound in either form and also the combination of said compound in both forms. The parts as used herein are by volume unless otherwise indicated.

*Table I*

| | Parts (volume) |
|---|---|
| 2 chlor butene 2 | 100 |
| Chloroform | 10 to 1000 |

*Table II*

| | Parts (volume) |
|---|---|
| 2 chlor butene 2 | 100 |
| Isopropyl alcohol | 5 to 25 |

*Table III*

| | Parts (volume) |
|---|---|
| 2 chlor butene 2 | 100 |
| Chloroform | 10 to 1000 |
| Isopropyl alcohol at least 5% to the combined volumes of 2 chlor butene 2 and chloroform, the upper limit being dependent upon the dilution with isopropyl alcohol desired | |

Instead of employing isopropyl alcohol, any of the other alcohols and preferably methyl, ethyl, or propyl alcohol may be substituted therefor in Tables II and III and the proportions are maintained as set forth in said tables. However, I prefer to employ isopropyl alcohol as the alcohol.

While the products of Tables I and II are stable for a period of at least a week, the products of Table III are stable for months and apparently for an indefinite period of time without adversely affecting the anesthetic properties thereof.

In accordance with my novel method, the aforementioned by-product fraction containing the metameric compounds 2 chlor butene 2 in both the trans and cis forms, 3 chlor butene 1 and 1 chlor butene 2 may be employed as the starting raw material. To said by-product fraction is added a quantity of an alcoholic solution of sodium or potassium hydroxide. I prefer to employ sodium hydroxide and the quantity thereof in ethyl alcohol is between 25% to 50% in excess of that required to react with all of the primary and secondary halides present in said fraction. Upon the addition of said alcoholic solution of sodium hydroxide to said fraction, there is a reaction between the sodium hydroxide and the primary halide whereupon the sodium derivative of the primary halide precipitates out. The entire mass is heated to boiling and maintained in this state of boiling under a reflux condenser until substantially all of the primary and secondary halides have reacted with the sodium hydroxide to form a precipitate. The mass is filtered through an appropriate filtering medium to separate the precipitate from the liquid which is recovered as the filtrate. The filtrate is washed with water in order to remove therefrom substantially all of the alcohol and sodium hydroxide. This washing is a simple operation requiring merely the addition of water thereto, agitation, allowing the aqueous phase to separate from the 2 chlor butene 2 phase and removing the aqueous phase therefrom. These washings are continued until the washings are substantially free from alkali and alcohol.

The washed product is then steam distilled to produce a clear water white distillate. This distillate is washed with water a few more times to separate therefrom any alcohol which may have become entrained therewith during said steam distillation step. After the water has been separated therefrom following the last washing, this product is completely dehydrated over sodium sulphate or calcium chloride. The dehydrated product, hereinafter known as product A, is substantially pure 2 chlor butene 2 cis and trans, has a specific gravity of about 0.906 at 25° C., has a boiling point range between 60° C. and 75° C., is clear, water white, has a pH of about 6, has a mild odor, is inflammable, but undergoes degradation within about 12 hours at normal temperature and pressure with consequent increase of acidity and becomes darker in color.

To a quantity of product A which is said substantially pure 2 chlor butene 2 cis and trans, preferably immediately after the last washing and water separation, is added a quantity of chloroform and/or an alcohol, preferably isopropyl alcohol. The quantity of chloroform added thereto may be between about 10 and 1000 parts by volume for each 100 parts of said 2 chlor butene 2 by volume. The quantity of alcohol and preferably isopropyl alcohol added to a quantity of said 2 chlor butene 2 is at least 5 and preferably between 5 and 25 parts by volume for each 100 parts of said 2 chlor butene 2 by volume. Said proportions are applicable in all three cases. In all cases after said additions have been made, the mass is distilled under a multiple plate column and preferably a column having between 20 and 100 plates, with a condenser at the upper end of the column, and I collect a definite condensate. This condensate has a boiling range between about 59° C. and 64° C. The major portion of said condensate has a constant boiling range within 61° C. and 62° C. These condensates contain 2 chlor butene 2, which is present substantially completely in only the trans form.

Constant boiling combinations of 2 chlor butene 2 trans, chloroform and isopropyl alcohol which are particularly stable over an indefinite period of time may be prepared by distilling under said multiple plate column and collecting the condensate boiling within 61° C. and 62° C. The following are specific examples of the original mix subjected to said distillation and disclose the end products obtained.

*Example 1*

Mixture subjected to distillation:

|  | Parts by volume |
|---|---|
| Product A | 780 |
| Chloroform | 780 |
| Isopropyl alcohol | 98 |

The fraction boiling within the temperature range of 61° C. to 62° C. which was collected as a condensate is a constant boiling liquid, is clear, water white, stable over an indefinite period of time, has a pH of about 6, and 100 parts by volume thereof consisted of about 46½ parts by volume of 2 chlor butene 2 trans, about 46½ parts by volume of chloroform and about 7 parts by volume of isopropyl alcohl.

*Example 2*

Mixture subjected to distillation:

|  | Parts by volume |
|---|---|
| Product A | 1000 |
| Chloroform | 310 |
| Isopropyl alcohol | 250 |

The fraction boiling within the temperature range of 61° C. to 62° C. which was collected as a condensate is a constant boiling liquid, is clear, water white, stable over an indefinite period of time, has a pH of about 6 and 100 parts by volume thereof consisted of about 78 parts by volume of 2 chlor butene 2 trans, about 15 parts by volume of chloroform and about 7 parts by volume of isopropyl alcohol.

I have found that the 2 chlor butene 2 trans may be maintained stable for an indefinite period of time by employing both chloroform and isopropyl alcohol in combination therewith and that for a matter of days said 2 chlor butene 2 trans will remain stable in the presence of either chloroform or isopropyl alcohol alone. I prefer that the ratio of the chloroform to the 2 chlor butene 2 by volume be at least 1 to 10 and the ratio of the isopropyl alcohol by volume to the combined volumes of isopropyl alcohol and 2 chlor butene 2 trans be at least about 5 to 100. In order to reduce the inflammability of the 2 chlor butene 2 trans, the ratio of the chloroform to the 2 chlor butene 2 trans by volume may be increased above 1 to 10 without adversely affecting the stability characteristic of said product.

Moreover the particular preferential ratio of the quantity by volume of isopropyl alcohol to the combined volume of 2 chlor butene 2 trans and chloroform is between about 7 to 100 and 8 to 100.

The stabilized 2 chlor butene 2 products heretofore described and examples of which are set forth in Tables I, II, III and Examples 1 and 2 may be employed as solvents for ethyl cellulose or benzyl cellulose, may be used as paint and varnish remover or as components thereof, may be employed as solvents for the so-called war chemicals, such as the sternutators, lachrymators, lethals and the like; they may also be heated in the presence of an acidic condensing agent such as aluminum chloride to provide resinous condensation products which may be substituted for shellac; they may be reacted with allyl chloride in the presence of an acidic condensing agent, such as ferric chloride, in the ratio by weight of 50 to 50 to 1 and heated under pressure of 4-5 atmospheres for the production of resinous organic condensation reaction products; they may be employed in mixture with ragweed, goldenrod or the like and either allowed to stand for days or boiled therewith after which the resultant liquid mass is fractionated and an oily liquid may be removed therefrom, said liquid having menthol and carrot odors.

Since certain changes in carrying out the above process and certain modifications in the compositions which embody the invention may be made without departing from its scope, it is intended that all matter contained in the above description shall be interpreted as illustrative and not in a limiting sense.

It is also to be understood that the following claims are intended to cover all of the generic and specific features of the invention herein described and all statements of the scope of the invention, which as a matter of language might be said to fall therebetween; and that they are intended to be inclusive in scope and not exclusive, in that, if desired, other materials may be added to my novel composition of matter herein claimed without departing from the spirit of the invention.

This application is a continuation in part of my copending application Serial Number 508,088 filed October 27, 1943 and the subject matter of said application is made part hereof.

I claim:

1. A composition of matter comprising 2 chlor butene 2, chloroform and isopropyl alcohol.

2. A composition of matter comprising 2 chlor butene 2, chloroform and isopropyl alcohol, the ratio of the quantity by volume of said 2 chlor butene 2 to the quantity by volume of said chloroform being between about 100 to 10 and 100 to 1000, the ratio of the quantity by volume of said isopropyl alcohol to the combined volumes of said 2 chlor butene 2 and said chloroform being at least 5 to 100.

3. A composition of matter comprising 2 chlor butene 2, chloroform and isopropyl alcohol, the ratio of the quantity by volume of said chloroform to the quantity by volume of said 2 chlor butene 2 being at least 1 to 10 and the ratio of the quantity by volume of said isopropyl alcohol to the combined volumes of said 2 chlor butene 2 and chloroform being within about 7 to 100 and 8 to 100.

4. The method comprising distilling a mass comprising 2 chlor butene 2, chloroform and isopropyl alcohol, the ratio of the quantity by volume of said 2 chlor butene 2 to the quantity by volume of said chloroform being between about 100 to 10 and 100 to 1000, the ratio of the quantity by volume of said isopropyl alcohol to the combined volumes of said 2 chlor butene 2 and said chloroform being at least 5 to 100 and collecting a quantity of distillate boiling within the temperature range of 61° C. and 62° C.

5. The method comprising heating a mass of 2 chlor butene 2, isopropyl alcohol and chloroform and collecting a quantity of distillate boiling within the temperature range of 61° C. and 62° C.

6. A composition of matter comprising 2 chlor butene 2, chloroform and an aliphatic liquid alcohol.

CLYDE B. GARDENIER.